United States Patent
Abdallah

(10) Patent No.: US 12,005,583 B2
(45) Date of Patent: Jun. 11, 2024

(54) ROBOTIC SYSTEM FOR MOVING A PAYLOAD WITH MINIMAL PAYLOAD SWAY AND INCREASED POSITIONING ACCURACY

(71) Applicant: GM GLOBAL TECHNOLOGY OPERATIONS LLC, Detroit, MI (US)

(72) Inventor: Muhammad E. Abdallah, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 17/666,699

(22) Filed: Feb. 8, 2022

(65) Prior Publication Data

US 2023/0249342 A1    Aug. 10, 2023

(51) Int. Cl.
  *B25J 9/16*    (2006.01)
(52) U.S. Cl.
  CPC ........... *B25J 9/1633* (2013.01); *B25J 9/1664* (2013.01)
(58) Field of Classification Search
  CPC ...... B25J 9/1633; B25J 9/1664; B25J 9/1651; B25J 9/16; B25J 9/1694; G05B 2219/39338; G05B 2219/40241; G05B 2219/40272
  USPC ........................................................ 700/254
  See application file for complete search history.

(56) References Cited

U.S. PATENT DOCUMENTS

| | | | |
|---|---|---|---|
| 7,185,774 B2* | 3/2007 | Colgate | ................... B66C 17/00 212/331 |
| 10,583,557 B2 | 3/2020 | Abdallah et al. | |
| 10,626,963 B2 | 4/2020 | Abdallah et al. | |
| 10,759,634 B2* | 9/2020 | Abdallah | ............. B25J 17/0208 |
| 2016/0039093 A1 | 2/2016 | Abdallah et al. | |
| 2020/0156245 A1 | 5/2020 | Abdallah et al. | |
| 2020/0282558 A1* | 9/2020 | Kim | ....................... B25J 9/1607 |

FOREIGN PATENT DOCUMENTS

| | | |
|---|---|---|
| DE | 102012220035 A1 | 5/2013 |
| DE | 102012220036 A1 | 5/2013 |
| DE | 102013204789 A1 | 9/2013 |
| DE | 102013203719 A1 | 11/2013 |
| DE | 102021130823 A1 | 8/2022 |
| EP | 1501754 | 8/2003 |

* cited by examiner

*Primary Examiner* — Adam R Mott
*Assistant Examiner* — Joseph Anthony Trias
(74) *Attorney, Agent, or Firm* — Quinn IP Law

(57) ABSTRACT

A robotic system for use with a payload includes a robot, a passive compliance mechanism, position sensors, and an electronic control unit (ECU). Actuated joints of the robot provide the robotic system with actuated degrees of freedom (DOF). The compliance mechanism is connected to the robot and payload, and has unactuated joints providing the robotic system with unactuated DOF. The sensors measure joint positions of the joints. The ECU has a trajectory generator block which generates a payload trajectory signal in response to dynamic control inputs, and an impedance control unit (ICU) applying damping and stiffness parameters to the payload trajectory signal to generate an initial velocity command. A stiction compensation block allows the robotic system to generate a velocity offset, and applies the velocity offset to the initial velocity command to produce a final velocity command for the robot.

20 Claims, 2 Drawing Sheets

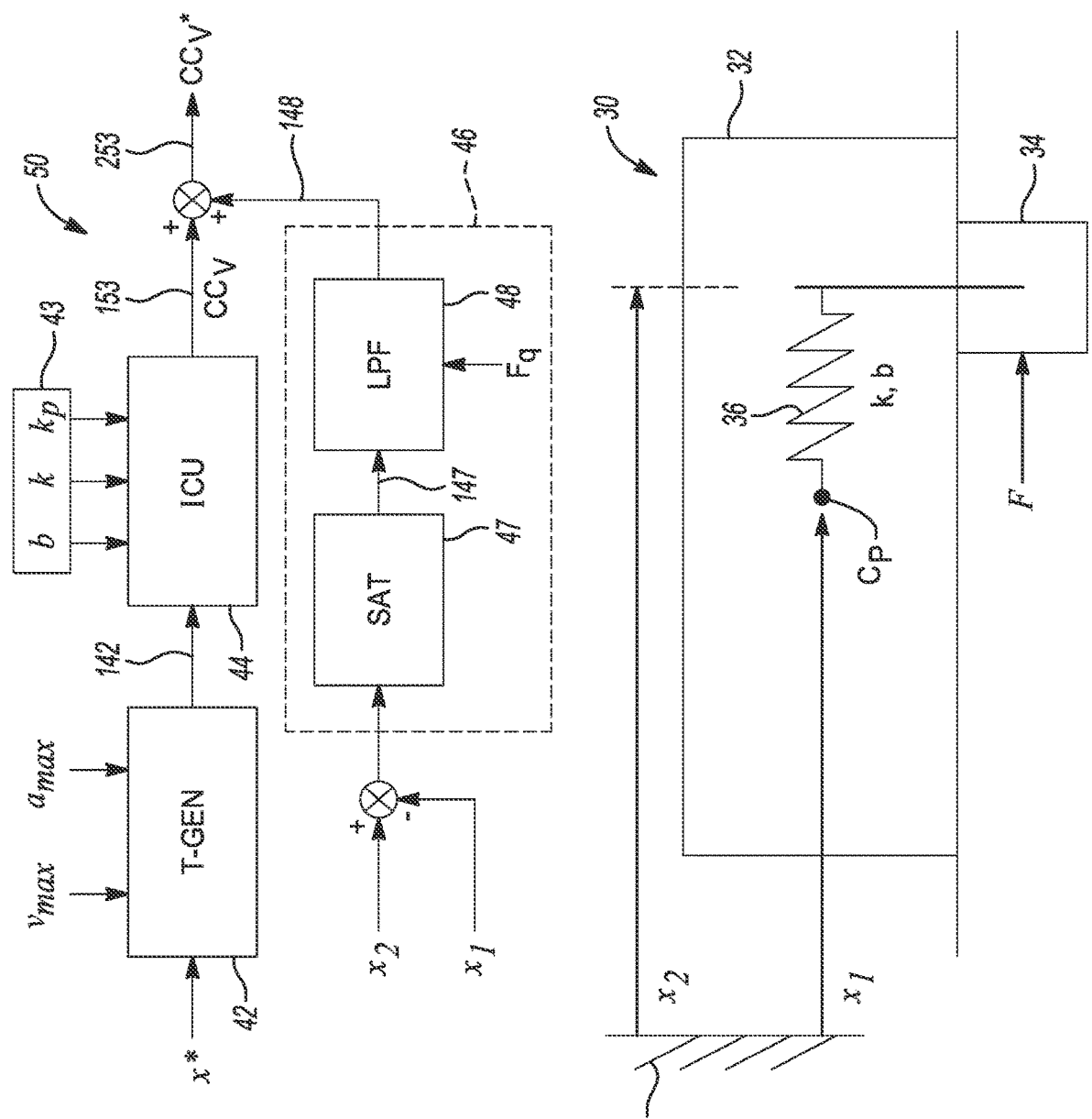

ROBOTIC SYSTEM FOR MOVING A PAYLOAD WITH MINIMAL PAYLOAD SWAY AND INCREASED POSITIONING ACCURACY

INTRODUCTION

Manufacturing operations often require a human operator to interact with a component, tool, or other payload within a defined workspace. For instance, a relatively cumbersome work piece such as a transmission case, engine, or motor generator unit may at times have to be moved within the workspace in the course of performing a vehicle assembly task. Task loads associated with positioning of such payloads were traditionally born by the operator and lift assistance devices employed within the workspace, e.g., chains, jacks, or hoists. The associated task loads have been greatly reduced in the modern workplace, and manufacturing efficiency and throughput increased, by a myriad of automation solutions. Underactuated robotic systems are one such automation solution.

In a typical underactuated robotic system, a robot is connected to a compliance mechanism as defined herein. Actuated joints of the robot collectively provide the robotic system with multiple rotational and/or translational degrees of freedom (DOF). The various revolute, universal, sliding, or pivoting joints are driven by one or more corresponding joint actuators, and thus are considered to be "active" joints. The compliance mechanism for its part may be embodied, e.g., as an articulated compliance mechanism or a suspension cable system. The constituent joints of the compliance mechanism are unactuated, and thus not driven by a corresponding joint actuator. The compliance mechanism therefore provides the robotic system with passive/unactuated DOF, and remains free to move in response to dynamic actions of the robot and possible direct interactions with an operator. As a result, increased compliance in the form of reduced stiffness is provided along a kinematic chain extending between the robot and the compliance mechanism when external forces are applied to the payload or the compliance mechanism.

SUMMARY

Disclosed herein is a robotic system for use in moving or positioning a payload, for instance in a manufacturing facility or an assembly plant. The construction of the robotic system as set forth in detail herein, and in particular the programming and hardware configuration of an associate electronic control unit (ECU), is intended to eliminate payload sway and increase payload positioning accuracy. The various hardware solutions, control methods, and related computer-readable storage medium-based implementations of the present teachings are therefore intended to improve upon the existing state of the art with regard to control of underactuated robotic systems in the face of static friction ("stiction") forces.

As used herein, "compliant", "compliance", "compliantly", and similar terms refer to the use of revolute, translational, universal, or other application-suitable joints as flexible/non-rigid joints, or possibly other joint constructions such as spherical or parallelogram/quadrilateral joints which collectively enable transmission of force and motion. Additionally, the present control solutions are based in part on the principle of underactuation. The term "underactuated" as used herein and in the general art refers to the use of a serial arrangement in which an actuated robot is coupled in series with a unactuated compliance mechanism, such that fewer than a total collective number of control degrees of freedom (DOF) of the robotic system are actuated DOF.

The robotic system in a possible embodiment includes a robot, a compliance mechanism connected to the robot, a payload coupled to the compliance mechanism, and the ECU. The ECU is in communication with the robot, and with a set of position sensors. The robot as contemplated herein may be variously embodied as a multi-axis serial robot, such as but not limited to a 6-axis industrial robot, or an overhead powered rail system or similar trolley/gantry. As such, the robot includes multiple actively-controlled/actuated joints providing the robotic system with a plurality of actuated DOF.

The compliance mechanism for its part includes multiple unactuated joints, which collectively provide the robotic system with a plurality of unactuated DOF. The position sensors are collectively configured to measure joint positions of the actuated and unactuated joints, and to output measured joint positions as electronic joint position signals. At a minimum, one position sensor may be used per unactuated DOF of the compliance mechanism. The payload, which may be connected to the compliance mechanism via an end-effector thereof, may be embodied as, e.g., a component or part, work tool, fixture, or another object to be moved and/or positioned by the robotic system within a defined workspace.

The ECU is in wired and/or wireless communication with the various position sensors. In response to the measured joint positions, and possibly a number, type, and/or configuration of the various unactuated joints relative to the actuated joints, the ECU selectively controls a position of the actuated joints of the robot. The manner in which the ECU accomplishes this control objective is optimized herein via programmed control logic, represented herein as corresponding logic/hardware blocks, which seek to eliminate payload sway, minimize position errors, and compensate for undesirable stiction forces in the above-noted kinematic chain.

According to a non-limiting exemplary embodiment, a robotic system for use with a payload includes a robot, a compliance mechanism, position sensors, and an ECU. The robot has actuated joints collectively providing the robotic system with multiple actuated DOF. The compliance mechanism, which is coupled in series with the robot and is connectable to the payload, includes unactuated joints collectively providing the robotic system with multiple unactuated DOF. The position sensors are collectively configured to measure corresponding joint positions of the actuated joints and the unactuated joints.

In this embodiment, the ECU is in communication with the robot and with the position sensors, and is programmed with a trajectory generator block operable for generating a payload trajectory signal in response to at least one dynamic control input. The ECU is also programmed with an impedance control unit (ICU) configured to apply predetermined damping and stiffness parameters to the payload trajectory signal to generate an initial velocity control signal, and a stiction compensation block configured to allow the robotic system to generate a velocity offset, and to apply the velocity offset to the initial velocity control signal to produce a final velocity control signal. The ECU is operable for transmitting the final velocity control signal to the robot to thereby cause the robot to move the payload.

The dynamic control input(s) may include a maximum permissible velocity and/or acceleration of the payload and the robot, in which case the ECU is configured to generate the payload trajectory signal such that an actual velocity and/or acceleration of the payload and the robot does not exceed the maximum permissible acceleration.

The stiction compensation block may be used to process the maximum displacement of the compliance mechanism through a saturation block, with the saturation block being configured to apply maximum and minimum limits to the maximum displacement to generate a limited displacement value. The stiction compensation block may also include a low-pass filter operable for receiving the limited displacement value and a cutoff frequency setting, and for generating the velocity offset using the limited displacement value and the cutoff frequency setting.

The ICU may be optionally configured to provide an overdamped response, and to avoid a velocity overshoot of the robot and the payload.

Also disclosed herein is a method for controlling a robotic system for use with a payload. An embodiment of the method includes connecting a compliance mechanism in series with a robot, and connecting the payload to the compliance mechanism. As noted above, the compliance mechanism has unactuated joints collectively providing the robotic system with multiple unactuated DOF, while the robot includes actuated joints collectively providing the robotic system with multiple actuated DOF. The method includes measuring corresponding joint positions of the actuated joints and the unactuated joints via a set of position sensors. The method additionally includes generating a payload trajectory signal via the ECU in response to at least one dynamic control input using a trajectory generator block, as well as applying predetermined damping and stiffness parameters to the payload trajectory signal via the ICU to generate an initial velocity control signal. This exemplary embodiment of the method also includes generating a velocity offset using a stiction compensation block of the ECU, applying the velocity offset to the initial velocity control signal to produce a final velocity control signal, and transmitting the final velocity control signal to the robot to thereby cause the robot to move the payload.

Another aspect of the subject disclosure includes a computer-readable storage medium on which is recorded instructions executable by a processor of an electronic control system of a robotic system having a compliance mechanism connected to a robot and to a payload, as set forth above. Execution of the instructions causes the processor to perform the above-summarized method.

The above features and advantages, and other features and advantages of the present disclosure, will be readily apparent from the following detailed description of the embodiment(s) and best mode(s) for carrying out the disclosure when taken in connection with the accompanying drawings and appended claims.

BRIEF DESCRIPTION OF THE DRAWINGS

FIG. 2 is a schematic control diagram of a representative embodiment of the ECU shown in FIG. 1.

FIG. 3 is a schematic illustration of a schematic linear model describing an aspect of the present teachings.

Figure 1:
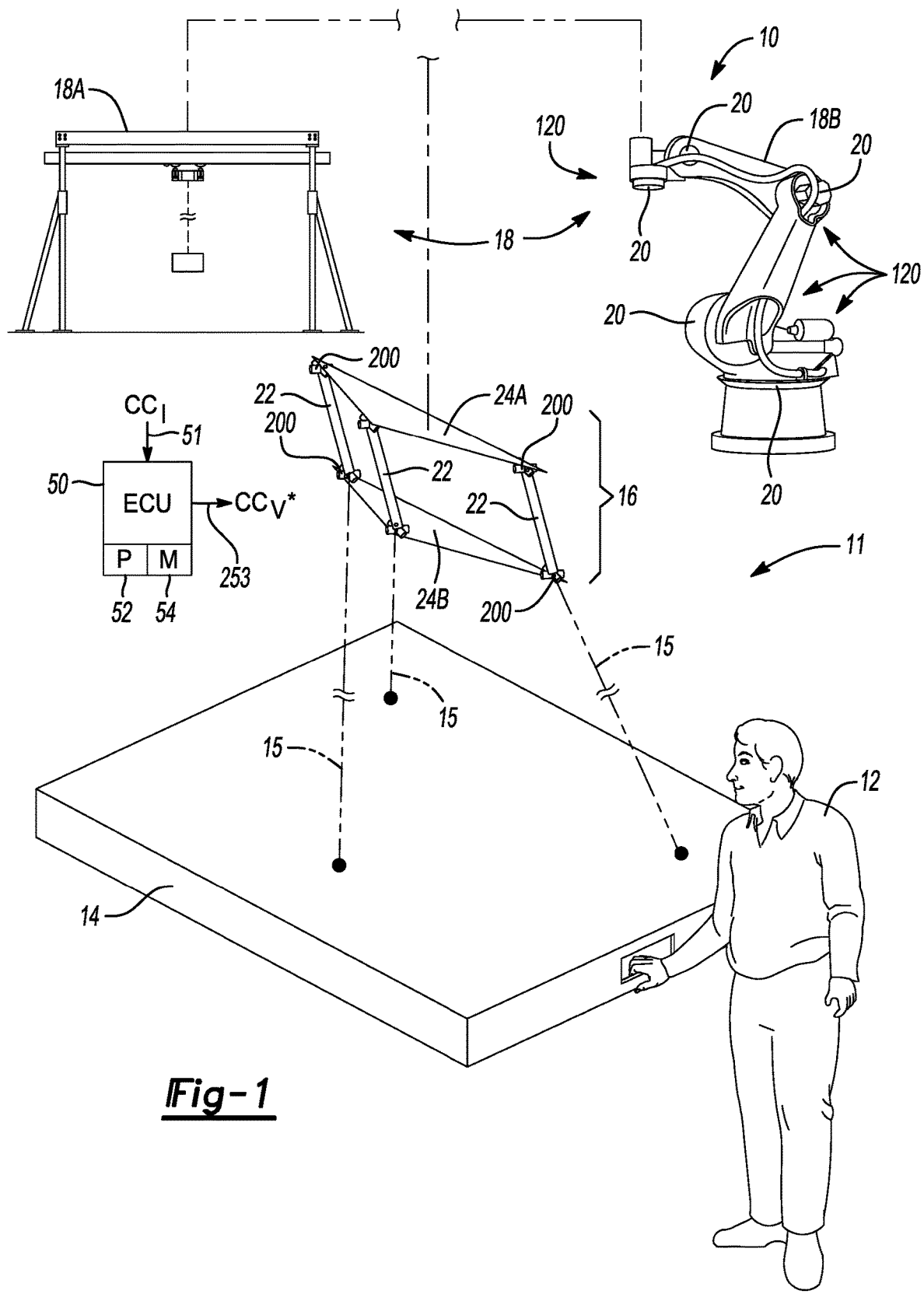
FIG. 1 is an illustration of a representative robotic system for moving a payload within a workspace, with the robotic system having an electronic control unit (ECU) configured to reduce sway and stiction while improving positioning accuracy.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Several embodiments of the present disclosure are illustrated in the accompanying drawings. The same or similar reference numerals are used in the drawings and the supporting description to refer to the same or similar structure. The drawings are provided in simplified form and, unless otherwise noted, are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure.

The present disclosure pertains to improved control strategies and hardware implementations for use with an underactuated robotic system. Representative examples of suitable compliance mechanisms having unactuated joints and associated unactuated degrees of freedom (DOF) include, but are not limited to, those which are disclosed in U.S. patent application Ser. No. 16/773,388, "Redundant Underactuated Robot with Multi-Mode Control Framework", now published as US2020/0156245A1, U.S. Pat. No. 10,759,634, "Electromechanical System for Interaction with an Operator", which issued on Sep. 1, 2020, and U.S. Pat. No. 10,626,963, "Articulated Mechanism for Linear Compliance", which issued on Apr. 21, 2020, the contents of which are hereby incorporated by reference in their entireties. Other suitable embodiments may be contemplated within the scope of the present disclosure.

Referring now to FIG. 1, a robotic system 10 is shown performing an operation in which an operator 12 acts on a payload 14. The payload 14 is connected to/suspended from a compliance mechanism 16, e.g., via a set of linkages 15, e.g., rigid arms, rods, or bars, or flexible or semi-rigid variations thereof, with the compliance mechanism 16 in turn connected to a robot 18A or 18B. The robot 18A may be embodied as an overhead crane or powered rail system of a type well understood in the art. Alternatively, the robot 18B may be used as a multi-axis serial robot, e.g., a 6-axis industrial robot. In these or other configurations, the compliance mechanism 16 is connected to a distal end link (not shown) of the robot 18A or 18B, collectively referred to hereinafter as a robot 18 for simplicity. The compliance mechanism 16 is thus suspended from the robot 18 within a defined workspace 11, which at times may be shared by the operator 12.

As summarized above, an underactuated robotic arrangement is formed when one connects an unactuated compliance device, exemplified herein as the compliance mechanism 16 of FIG. 1, to an actuated robot 18. That is, the various joints 20 of the robot 18 are driven via a corresponding joint actuator 120, e.g., a linear or rotary motor or other suitable actuator. This occurs in response to final velocity control signals 253 (arrow CCv*) from an associated electronic control unit (ECU) 50, details of which are depicted in FIG. 2 and described below.

To this end, the ECU 50 receives a set of input signals 51, also labeled as arrow $CC_1$ for clarity, which are indicative of the corresponding measured joint positions of the actuated joints 20 of the robot 18, as well as the corresponding joint positions of the unactuated joints 200 of the compliance mechanism 16. Unlike the actuated joints 20 of the robot 18, however, the unactuated joints 200 of the compliance mechanism 16 do not have a corresponding joint actuator 120 connected thereto. The ECU 50 is operable for generating and transmitting the final velocity control signals 253 to command movement of one or more of the actuated joints 20 of the robot 18, and thus to cause the robot 18 to move the payload 14. This control action may occur, as specified elsewhere hereinabove, based in part on a number, type, and configuration of the unactuated joints 200 relative to the actuated joints 20.

The ECU 50 as envisioned herein includes one or more digital computer devices collectively including at least one processor (P) 52 and sufficient memory (M) 54. The term "controller" and related terms such as microcontroller, control module, module, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s). Associated non-transitory memory component(s) in the form of the memory 54 may include sufficient amounts of tangible, non-transitory memory, e.g., read only memory, flash memory, optical and/or magnetic memory, electrically-programmable read only memory, and the like. The memory 54 also includes sufficient transient memory such as random access memory and electronic buffers. Hardware components of the ECU 50 may include, among other things, a high-speed clock, analog-to-digital and digital-to-analog circuitry, and input/output circuitry and devices, as well as proper signal conditioning and buffer circuitry.

In the non-limiting representative embodiment of FIG. 1, the compliance mechanism 16 includes end plates 24A and 24B that are interconnected via bars 22 using the unactuated joints 200. The shape and size of the end plates 24A and 24B may vary with the application, with the triangular shape depicted in FIG. 1 is just one possible construction. Other arrangements such as parallelograms may be used to achieve similar levels of compliance, or multiple compliance mechanisms 16 may be connected in series for additional unactuated DOF.

Referring to FIG. 2, the ECU 50 includes a trajectory generator block (T-GEN) 42, with "block" as used herein referring to encoded computer-executable instructions providing the requisite functionality, as well as associated hardware for executing such logic. As its core function, the trajectory generator block 42 generates a payload trajectory signal 142 describing a desired speed and path of travel of the payload 14. One may implement the trajectory generator block 42 as computer-executable code, e.g., using MATLAB®, to output the payload trajectory signal 142. In a possible implementation, the trajectory generator block 42 receives different inputs: a desired position command (x*), a maximum permissible velocity ($v_{max}$), and/or a maximum permissible acceleration ($a_{max}$). Given the knowledge of the ECU 50 of the current position of the payload 14, the compliance mechanism 16, and the robot 18 of FIG. 1 in free space, the trajectory generator block 42 shown in FIG. 2 is able to calculate the payload trajectory signal 142 as an electronic output signal.

The ECU 50 also includes an impedance control unit (ICU) 44 downstream of the trajectory generator block 42, with the ICU 44 receiving the payload trajectory signal 142 as an electronic input signal. The ICU 44 is configured to apply application-suitable suitable impedance control law to regulate the motion of the payload 14. By way of an example, the ICU 44 could model motion of the payload 14 as a mass-spring-damper system, as appreciated in the art, thus producing a desired $2^{nd}$ order behavior. While various approaches may be used to implement the ICU 44, one possible approach is disclosed in U.S. Pat. No. 10,583,557, "Redundant Underactuated Robot with Multi-Mode Control Framework", which issued on Mar. 10, 2020, and which is hereby incorporated by reference in its entirety. Such an approach allows the ECU 50 to specify an overdamped response behavior, which allows for motion of the payload 14 without sway as one of the attendant benefits of the present teachings.

To optimize performance of the ICU 44 shown in FIG. 2, an impedance tuning block 43 may be implemented to enable user-based or automatic selection of impedance parameters, including a damping coefficient (b), a stiffness coefficient (k), and a proportional gain ($k_p$). The ICU 44 thus acts on the payload trajectory signal 142 within an established impedance control framework, informed by the values provided via the impedance tuning block 43 to output an initial velocity control signal 153, also labeled as arrow CCv for clarity.

Additionally, the ECU 50 may utilizes a stiction compensation block 46 having a saturation block (SAT) 47 and a low-pass filter (LPF) 48 as set forth below. The saturation block 47 and low-pass filter 48 ultimately work together to generate a velocity offset 148, which additively combines with the above-noted initial velocity control signal 153 to produce the final velocity control signal 253, which is also depicted in FIG. 1. Operation of the various components of the ECU 50 will now be described in further detail with continued reference to FIG. 2.

Impedance Tuning: the above-noted impedance parameters b, k, and $k_p$ are selected or tuned herein to meet the disclosed motion control objectives when acting on the payload 14 of FIG. 1. Although the ICU 44 receives the velocity trajectory signal 142 from the trajectory generator block 42, use of the ICU 44 could still result in overshoot of the specified maximum permissible velocity by the robot 18 and/or the payload 14. Eliminating sway of the payload 14 using the present teachings keeps the payload 14 from exceeding the defined maximum permissible velocity. Adjusting the stiffness coefficient (k) controls the top speed of the robot 18, thus affecting the speed of the payload 14.

Envisioned tuning within the scope of the present disclosure may include increasing damping by increasing the damping coefficient (b), i.e., via adjustment of the damping coefficient (b) until an overdamped behavior of the robot 18 is achieved. This in turn eliminates sway of the payload 14 while also eliminating velocity overshoot. Tuning may also include decreasing the stiffness coefficient (k) until the robot 18 no longer overshoots the specified maximum permissible velocity of the payload trajectory signal 142 from the trajectory generator block 42. However, this control action has the noted disadvantage of increasing position error for the robot 18, which is addressed herein using the contemplated stiction compensation.

Stiction Compensation: steady-state position errors in positions of the payload 14 may arise at times from static friction ("stiction") forces in the compliance mechanism 16 of FIG. 1. Such errors may be reduced by increasing stiffness via the ICU 44, i.e., via adjustment of the aforementioned stiffness parameter (k). However, stiffness is reduced to observe the specified velocity limits of the payload trajectory signal 142. The present control strategy therefore introduces an additional control component to help compensate for undesirable stiction-induced position errors, which in turn significantly reduces overall position error when using the robotic system 10 of FIG. 1 to move the representative payload 14.

Motion & Control Law: referring briefly to FIG. 3, the compliance mechanism 16 may act in the manner of a pendulum, using gravity as a restoring force. Using a simplified linear model 30 of such a pendulum, a mass 34 representing the combined payload 14 and compliance mechanism 16 of FIG. 1 is securely connected to a moveable cart 32, with the moveable cart 32 in this case corresponding to the robot 18 of FIG. 1. The noted connection is represented by a spring 36 having a stiffness represented by the coefficient of stiffness (k) also shown in FIG. 2. The spring 36 may center the compliance mechanism 16 as a physical spring when the mass 34 is released. Alternatively, if the robotic system 10 of FIG. 1 uses gravity as a restoring force, then $k_s$ as noted below would be a linear approximation of the stiffness. The spring 36 in turn is connected to a stationary member 38 and to a center point Cp of the cart 32, with the spring 36 also having the damping coefficient (b).

As represented in FIG. 3, $x_1$ is the position of the cart 32 relative to the stationary member 38. $x_2$ is the position of the payload 14 and the compliance mechanism 16, likewise relative to the position of the stationary member 38. A desired impedance relationship for an end-effector of the compliance mechanism 16 may be modeled as follows:

$$m\ddot{x}_2 + b\dot{x}_2 + k(x_2 - x_2^*) = F \quad (1)$$

where m is the mass 34, b is the damping coefficient, k is the stiffness coefficient, and $x_2^*$ is a commanded position of the payload 14. Additionally, F represents an external force applied to the mass 34, e.g., by the operator 12 of FIG. 1. A force analysis on the compliance mechanism 16 provides the following equation of motion, neglecting friction:

$$m\ddot{x}_2 = F + k_s(x_1 - x_2^*) \quad (2)$$

Assuming the robot 18 of FIG. 1 employs a 1$^{st}$ order position controller with a proportional gain of $k_p$:

$$\dot{x}_1 = -k_p(x_1 - x_1^*) \quad (3)$$

Solving from the above-noted equations (1) and (2), the control law for the desired macro position follows as:

$$x_1^* = x_2 - \frac{b}{k_s}\dot{x}_2 - \frac{k}{k_s}(x_2 - x_2^*) \quad (4)$$

Stiction Compensation: stiction in the compliance mechanism 16 of FIG. 1 may lead to positioning errors. Positioning accuracy of the compliance mechanism 16 within a given impedance control framework may be increased using the following exemplary approach. First, one may analyze the position errors introduced by stiction forces. Given a 1$^{st}$ order controller from equations (3) and (4), the velocity commanded of the robot 18 follows as:

$$\dot{x}_1 = k_p(x_2 - x_1 - b'\dot{x}_2 - k'(x_2 - x^*)) \text{ where} \quad (5)$$
$$b' = \frac{b}{k_s}, \text{ and } k' = \frac{k}{k_2}.$$

The steady-state result may be analyzed, where the robot 18 and articulated compliance mechanism 16 come to a stop but stiction forces cause an error between the above-described positions $x_1$ and $x_2$. That is, the stiction forces result in a displacement $\Delta x$ between the compliance mechanism 16 and the robot 18, of $$\Delta x = \frac{f}{k_s},$$

where f is the stiction force. Hence:

$$0 = k_p(x_2 - x_1 - k'(x_2 - x^*)) \quad (6)$$
$$= \Delta x - k'(x_2 - x^*) \quad (7)$$

The above formulations in turn results in the following steady-state error:

$$x_2 = x^* + \frac{1}{k'}\Delta x \quad (8)$$

The error term $$\frac{1}{k'}\Delta x$$

is decreased by increasing the stiffness coefficient k. However, the gains are limited in a practical application. To compensate for stiction, therefore, the velocity offset 148, represented as $\delta$, is introduced by the ECU 50:

$$\dot{x}_1 = k_p(x_2 - x_1 - b'\dot{x}_2 - k'(x_2 - x^*) + \delta) \quad (9)$$

Since the stiction force is not directly measurable, displacement of the compliance mechanism 16 is used herein as a measure of the stiction. Since the displacement $(x_2 - x_1)$, or simply $\Delta x$, of the compliance mechanism 16 is representative of the stiction at small values and under static situations, the introduced the velocity offset $\delta$ may be defined as:

$$\delta = H(s) \cdot [x_2 - x_1] \quad (10)$$

where H(s) represents the low-pass filter 48 of FIG. 2 for a particular cutoff frequency setting (Fq), and [•] is a saturation transfer function representing the saturation block 47. Thus, the output (arrow 147) from the saturation block 47 processed via the low-pass filter 48 to produce the velocity offset $\delta$, which once again corresponds to 148 in FIG. 2.

Thus, the impedance control law executed by the ECU 50 of FIGS. 1 and 2 may be programmed to use the trajectory generator block 42 of FIG. 2 with the maximum permissible velocity ($v_{max}$), increase damping via the ICU 44 to point where an overdamped behavior is achieved, and apply stiction compensation via block 46 to increase the overall position accuracy. The disclosed solutions improve the general state of the art of impedance-based control of underactuated robotic systems when operating on a payload, e.g., the representative payload 14 shown in FIG. 1.

In a simplified cart-pendulum system such as the one exemplified in FIG. 3, the present solutions provide an automated methodology for moving the payload 14 without sway, with improved position accuracy. This desirable control action occurs while observing the maximum permissible velocity ($v_{max}$) and acceleration ($a_{max}$) for both the robot 18 and the suspended payload 14. Absent the present teachings, the payload 14 is prone to oscillation and the various problems associated therewith.

To illustrate one such potential problem, in an exemplary use scenario in which a payload 14 has a desired maximum velocity of 400 mm/s, the payload 14 could reach velocities of 500 mm/s solely due to the above-described swaying action. Using the present teachings, however, payload sway is eliminated, and thus the velocity of the payload 14 and the robot 18 does not exceed the specified desired maximum. Such a result improves upon the state of the art of payload control within a shared work environment in which human operators may be present. Similarly, without applying the disclosed stiction compensation solutions, position errors of 10-15 mm may result in the same scenario. Position errors may be decreased to under 1 mm, or by at least 90 percent, in the same exemplary embodiment. Thus, the foregoing teachings also improve upon the general state of the art of impedance control of underactuated macro-mini robotic systems by providing these and other possible benefits and performance advantages.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. A robotic system for use with a payload, comprising:
   a robot having actuated joints collectively providing the robotic system with multiple actuated degrees of freedom (DOF);
   a compliance mechanism coupled in series with the robot and connectable to the payload, the compliance mechanism having unactuated joints collectively providing the robotic system with multiple unactuated DOF;
   a set of position sensors collectively configured to measure corresponding joint positions of the actuated joints and the unactuated joints; and
   an electronic control unit (ECU) in communication with the robot and with the set of position sensors, wherein the ECU is programmed with:
      a trajectory generator block operable for generating a payload trajectory signal in response to at least one dynamic control input, including a maximum permissible velocity and a maximum permissible acceleration of the payload and the robot;
      an impedance control unit (ICU) configured to generate an initial velocity command in response to the payload trajectory signal that (i) increases a damping coefficient (b) until an overdamped behavior of the robot is achieved that eliminates sway of the payload, and (ii) decreases a stiffness coefficient (k) sufficiently to prevent overshoot of the maximum permissible velocity; and
      a stiction compensation block configured to allow the robotic system to generate a velocity offset, and to apply the velocity offset to the initial velocity control signal from the ICU to produce a final velocity control signal, wherein the velocity offset is configured to minimize a position error of the robot and payload due to static friction, wherein the ECU is operable for transmitting the final velocity control signal to the robot to thereby cause the robot to move the payload without the sway of the payload.

2. The robotic system of claim 1, wherein the ECU is configured to generate the payload trajectory signal such that an actual velocity of the payload and the robot does not exceed the maximum permissible velocity.

3. The robotic system of claim 1, wherein the ECU is configured to generate the payload trajectory signal such that an actual acceleration of the payload and the robot does not exceed the maximum permissible acceleration.

4. The robotic system of claim 1, wherein the stiction compensation block is configured to calculate the velocity offset as a function of a maximum displacement of the compliance mechanism.

5. The robotic system of claim 4, wherein the stiction compensation block is configured to process the maximum displacement of the compliance mechanism through a saturation block, the saturation block being configured to apply maximum and minimum limits to the maximum displacement to generate a limited displacement value.

6. The robotic system of claim 5, wherein the stiction compensation block includes a low-pass filter operable for receiving the limited displacement value and a cutoff frequency setting, and to generate the velocity offset using the limited displacement value and the cutoff frequency setting.

7. The robotic system of claim 1, wherein the robot comprises a multi-axis industrial robot.

8. The robotic system of claim 1, wherein the robot comprises an overhead rail system or trolley.

9. The robotic system of claim 1, wherein the compliance mechanism includes multiple interconnected linkages, such that the compliance mechanism comprises an articulated compliance mechanism.

10. The robotic system of claim 1, wherein the ICU is configured to provide the overdamped behavior, and to avoid a velocity overshoot of the robot and the payload via the overdamped behavior.

11. A method for controlling a robotic system for use with a payload, comprising:
    connecting a compliance mechanism in series with a robot;
    connecting the payload to the compliance mechanism, wherein the compliance mechanism has unactuated joints collectively providing the robotic system with multiple unactuated degrees of freedom (DOF), and wherein the robot includes actuated joints collectively providing the robotic system with multiple actuated DOF;
    measuring corresponding joint positions of the actuated joints and the unactuated joints via a set of position sensors; and
    via an electronic control unit (ECU) in communication with the robot and the set of position sensors:
       receiving dynamic control inputs via a trajectory generator block of the ECU, including receiving a desired position command of the payload and the robot, a maximum permissible velocity of the payload and the robot, and a maximum permissible acceleration of the payload and the robot;
       generating a payload trajectory signal in response to the dynamic control inputs using the trajectory generator block of the ECU;
       generating an initial velocity command in response to the payload trajectory signal, including (i) increasing a damping coefficient (b) until an overdamped behavior of the robot is achieved that eliminates sway of the payload, and (ii) decreasing a stiffness coefficient (k) sufficiently to prevent overshoot of the maximum permissible velocity, via an impedance control unit (ICU) of the ECU;

generating a velocity offset using a stiction compensation block of the ECU, wherein the velocity offset is configured to minimize position error of the robot and payload due to static friction;

applying the velocity offset to the initial velocity control signal to produce a final velocity control signal; and transmitting the final velocity control signal to the robot to thereby cause the robot to move the payload without the sway of the payload.

12. The method of claim 11, further comprising:
generating the payload trajectory signal, such that corresponding actual velocities of the payload and the robot do not exceed the maximum permissible velocity.

13. The method of claim 11, further comprising:
generating the payload trajectory signal, such that corresponding actual accelerations of the payload and the robot do not exceed the maximum permissible acceleration.

14. The method of claim 11, further comprising: calculating the velocity offset via the stiction compensation block as a function of a maximum displacement of the compliance mechanism.

15. The method of claim 14, further comprising: processing the maximum displacement of the compliance mechanism through a saturation block of the ECU, including applying maximum and minimum limits to the maximum displacement, thereby generating a limited displacement.

16. The method of claim 15, further comprising:
receiving the limited displacement and a cutoff frequency setting via a low-pass filter of the stiction compensation block; and generating the velocity offset via the stiction compensation block using the limited displacement and the cutoff frequency setting.

17. The method of claim 11, wherein connecting the compliance mechanism to the robot includes connecting the compliance mechanism to an overhead rail system or trolley, or to a multi-axis serial robot.

18. The method of claim 11, wherein the compliance mechanism comprises an articulated compliance mechanism having a plurality of linkages interconnected via the unactuated joints, and wherein connecting the compliance mechanism to the robot includes connecting the articulated compliance mechanism to the robot.

19. A non-transitory computer-readable storage medium on which is recorded instructions executable by a processor of an electronic control system of a robotic system, the robotic system having a compliance mechanism to a payload, wherein execution of the instructions causes the processor to:

receive corresponding joint positions of actuated joints and unactuated joints of the robotic system from a set of position sensors of the robotic system;

generate a payload trajectory signal in response to a dynamic control input using a trajectory generator block of an electronic control unit (ECU), the dynamic control input including a desired position command, a maximum permissible velocity, and a maximum permissible acceleration of the payload and the robot;

apply damping and stiffness parameters to the payload trajectory signal via an impedance control unit (ICU) of the ECU to generate an initial velocity control signal, including (i) increasing a damping coefficient (b) until an overdamped behavior of the robot is achieved that eliminates sway of the payload, and (ii) decreasing a stiffness coefficient (k) sufficiently to prevent overshoot of the maximum permissible velocity;

generate, using a stiction compensation block of the ECU, a velocity offset as a function of a maximum displacement of the compliance mechanism;

apply the velocity offset to the initial velocity control signal to produce a final velocity control signal; and transmit the final velocity control signal to the robot to thereby cause the robot to move the payload without payload sway.

20. The non-transitory computer-readable storage medium of claim 19, wherein execution of the instructions by the processor causes the processor to:

process the maximum displacement through a saturation block, including applying maximum and minimum limits to the maximum displacement, thereby generating a limited displacement;

receive the limited displacement and a cutoff frequency setting via a low-pass filter of the stiction compensation block; and generate the velocity offset using the limited displacement and the cutoff frequency setting.

* * * * *